United States Patent
Di Cairano-Gilfedder et al.

(10) Patent No.: US 10,594,824 B2
(45) Date of Patent: Mar. 17, 2020

(54) CONTENT DESIGNATION FOR A CONTENT DELIVERY NETWORK

(71) Applicants: Khalifa University of Science, Technology and Research, Abu Dhabi (AE); Emirates Telecommunications Corporation, Abu Dhabi (AE); British Telecommunications PLC, London (GB)

(72) Inventors: Carla Di Cairano-Gilfedder, London (GB); Siddhartha Shakya, London (GB); Beum Seuk Lee, London (GB); Gilbert Owusu, London (GB); Kin Poon, Abu Dhabi (AE)

(73) Assignees: Khalifa University of Science, Technology and Research, Abu Dhabi (AE); Emirates Telecommunications Corporation, Abu Dhabi (AE); British Telecommunications PLC, London (GB)

( * ) Notice: Subject to any disclaimer, the term of this patent is extended or adjusted under 35 U.S.C. 154(b) by 0 days.

(21) Appl. No.: 15/933,995

(22) Filed: Mar. 23, 2018

(65) Prior Publication Data
US 2018/0278713 A1  Sep. 27, 2018

(30) Foreign Application Priority Data
Mar. 27, 2017 (EP) .................................. 17163172
Mar. 27, 2017 (GB) .................................. 1704865.3

(51) Int. Cl.
G06F 15/16 (2006.01)
H04L 29/08 (2006.01)
(Continued)

(52) U.S. Cl.
CPC ......... *H04L 67/2842* (2013.01); *G06N 20/00* (2019.01); *H04L 41/0823* (2013.01);
(Continued)

(58) Field of Classification Search
CPC . H04L 67/2842; H04L 65/4069; H04L 43/08; H04L 41/509; H04L 41/0823; H04L 41/5019; H04L 67/2833; G06N 20/00
(Continued)

(56) References Cited

U.S. PATENT DOCUMENTS

2003/0099237 A1   5/2003   Mitra et al.
2013/0268629 A1  10/2013   Fieau et al.
(Continued)

FOREIGN PATENT DOCUMENTS

WO   2006079980   8/2006

OTHER PUBLICATIONS

Internet Engineering Task Force; Use Cases for Content Delivery Network Interconnection; Bertrand, et al.; Feb. 10, 2013.
(Continued)

*Primary Examiner* — Frantz B Jean
(74) *Attorney, Agent, or Firm* — Calfee, Halter & Griswold, LLP

(57) ABSTRACT

A method for designating a class of data content for determining how the content will be handled by a content delivery network (CDN) into one of: a transport designation by which content is transported from an entrance node to one or more edge nodes; a caching designation by which the content is stored at one or more edge nodes; and a hybrid designation by which content is stored at a node in the CDN for subsequent transport to one or more edge nodes in the CDN, the method comprising: determining a set of one or more transport designation options; determining a set of one or more caching designation options; determining a set of
(Continued)

one or more hybrid designation options; determining a normalised measure resource requirement for each of the transport, caching and hybrid designation options; and selecting one designation option for the class of content from all of the transport, caching and hybrid designation options by an optimisation function for selecting the designation option based on the determined normalised resource requirement for each option.

24 Claims, 6 Drawing Sheets

(51) Int. Cl.
*H04L 29/06* (2006.01)
*H04L 12/24* (2006.01)
*G06N 20/00* (2019.01)
*H04L 12/26* (2006.01)

(52) U.S. Cl.
CPC ........ *H04L 41/509* (2013.01); *H04L 41/5019* (2013.01); *H04L 65/4069* (2013.01); *H04L 67/2833* (2013.01); *H04L 43/08* (2013.01)

(58) Field of Classification Search
USPC ........................................................ 709/231
See application file for complete search history.

(56) References Cited

U.S. PATENT DOCUMENTS

| | | | |
|---|---|---|---|
| 2014/0280454 A1 | 9/2014 | Medard et al. | |
| 2015/0006615 A1* | 1/2015 | Wainner | H04L 29/06047 709/203 |
| 2016/0226992 A1* | 8/2016 | Akcin | H04L 67/2842 |
| 2017/0353516 A1* | 12/2017 | Gordon | H04N 21/8456 |

OTHER PUBLICATIONS

Internet Engineering Task Force; Content Delivery Network Interconnection (CDNI) Control Interface/Triggers; Murray et al.; Dec. 2016.
Cisco Visual Networking Index: Forecast and Methodology, 2015-2020; 2016.
Inter-Provider Quality of Service; S. Amante et al.; Nov. 17, 2006.
Telco CDN Interconnection for Global Content Exchange; ITU Workshop on "Bridging the Standardization Gap"; Vientiane, Lao People's Democratic Republic; Jul. 30-31, 2012.
Mailik The Storage vs Bandwith Debate; Jun. 24, 2011.
European Search Report from IPO, Application No. 17163172.4; British Telecommunications PLC, dated Sep. 6, 2017.
European Search Report from IPO, Application No. GB1704865.3; Patents Act 1977: Search Report under Section 17, dated Aug. 24, 2017.

* cited by examiner

CONTENT DESIGNATION FOR A CONTENT DELIVERY NETWORK

FIELD OF THE INVENTION

The present invention relates to content designation for a content delivery network. In particular, it relates to optimisation of content designation.

BACKGROUND

Internet traffic is expected to increase nearly threefold over the coming years mainly driven by on-line video content and non-PC devices ("Cisco VNI Forecast and Methodology, 2015-2020", Cisco White Paper, 1 Jun. 2016). Historically, telecommunications operators and "last-mile" providers (i.e. service providers delivering a final leg of a telecommunications network providing services to end-users or consumers) have been unable to guarantee a required consistent quality for the delivery of emerging content, especially when delivery involved intercontinental links. This challenge has been sought to be addressed by Content Distribution Networks (CDNs) which Content Providers (CPs, such as media companies, television companies and the like) rely upon to deliver their content with strict performance guarantees. Other models in the content delivery market include: last-mile provider plus Global CDN; last-mile provider plus Global CP; and/or last-mile provider's own CDNs which are interconnected or Federated ("Telco CDN interconnection for Global Content Exchange", ITU Workshop on "Bridging the Standardization Gap", 30-31 Jul. 2012, Lao People's Democratic Republic, available at: www.itu.int/dms_pub/itu-t/oth/06/5B/T065B00002000 52PPTE.ppt).

In recent years, several use-cases have been envisaged for CDN Interconnection as documented by the Internet Engineering Task Force (IETF) in "Use Cases for Content Delivery Network Interconnection" (Bertrand et al, 2012, available at tools.ietf.org/html/draft-ietf-cdni-use-cases-10). These include regional CDNs interconnecting to deliver content to each other's consumers or global CDNs terminating content to regional CDN, or federations among CDNs with multi-lateral agreements. In the context of CDN-federation, standards are also being developed, such as at the IETF, that enable interconnected CDNs to request pre-positioning of content within their own boundaries ("Content Delivery Network Interconnection (CDNI) Control Interface/Triggers", Murray R. & Niven-Jenkins, B, IETF RFC 8007, December 2016, available at datatracker.ietf.org/doc/rfc8007). Content delivery operations driven by CDN-interconnected protocols present a challenge of determining which content should designated for pre-positioning in a CDN (such as a target CDN for local consumer access) and/or which content should be designated for transport to, and/or via, a target CDN only in response to an access request (such as a request for access/retrieval by a content consumer).

Methods for positioning of content (within a collection and/or federation of CDNs) attempt to minimise delivery overhead, such as resource consumption, and improve performance, such as for a consumer, a CDN or the network as a whole. Such approaches focus on content popularity and are frequently based on expert engineers' judgement.

Thus, it would be advantageous to provide for content delivery via multiple interconnected CDNs in which a designation of content for either: transport to a client via one or more CDNs on request; or storage of the content, such as by caching, in a CDN in anticipation of a request, is determined.

An exemplary embodiment of the present invention provides a method for designating a class of data content for delivery via a content delivery network (CDN) to content consumers, the CDN including: an entrance node through which the content enters the CDN; one or more intermediate nodes through which the content traverses the CDN; and one or more edge nodes for delivering the content to the content consumers, and the designation of the content determining how the content will be handled by the CDN as one of: a transport designation by which content is transported from the entrance node to one or more edge nodes; a caching designation by which the content is stored at one or more edge nodes; and a hybrid designation by which content is stored at a node in the CDN for subsequent transport to one or more edge nodes in the CDN, the method comprising: determining a set of one or more transport designation options each identifying a set of nodes and links between nodes for transporting the content from the entrance node to one or more edge nodes for delivery to content consumers; determining a set of one or more caching designation options each identifying a set of edge nodes for storage of the content; determining a set of one or more hybrid designation options each identifying a set of nodes for storage of the content and a set of nodes and links between nodes for transporting the stored content to edge nodes; determining a normalised measure resource requirement for each of the transport, caching and hybrid designation options; and selecting one designation option for the class of content from all of the transport, caching and hybrid designation options by an optimisation function for selecting the designation option based on the determined normalised resource requirement for each option.

A further exemplary embodiment of the present invention provides A computer system including a processor and memory storing computer program code which, when executed, causes the processor to select a designation option of a class of data content, for delivery via a content delivery network (CON) to content consumers, the CDN including: an entrance node through which the content enters the CDN; one or more intermediate nodes through which the content traverses the CDN; and one or more edge nodes for delivering the content to the content consumers, and the designation of the content determining how the content will be handled by the CDN as one of: a transport designation by which content is transported from the entrance node to one or more edge nodes; a caching designation by which the content is stored at one or more edge nodes; and a hybrid designation by which content is stored at a node in the CDN for subsequent transport to one or more edge nodes in the CDN, the selection being performed by the processor carrying out the following steps: determining a set of one or more transport designation options each identifying a set of nodes and links between nodes for transporting the content from the entrance node to one or more edge nodes for delivery to content consumers; determining a set of one or more caching designation options each identifying a set of edge nodes for storage of the content; determining a set of one or more hybrid designation options each identifying a set of nodes for storage of the content and a set of nodes and links between nodes for transporting the stored content to edge nodes; determining a normalised measure resource requirement for each of the transport, caching and hybrid designation options; and selecting one designation option for the class of content from all of the transport, caching and hybrid designation options by an optimisation function for selecting the designation option based on the determined normalised resource requirement for each option.

A further exemplary embodiment of the present invention provides a computer program element comprising computer program code to, when loaded into a computer system having a processor and executed thereon, causes the processor to select a designation option of a class of data content, for delivery via a content delivery network (CD N) to content consumers, the CDN including: an entrance node through which the content enters the CDN; one or more intermediate nodes through which the content traverses the CDN; and one or more edge nodes for delivering the content to the content consumers, and the designation of the content determining how the content will be handled by the CDN as one of: a transport designation by which content is transported from the entrance node to one or more edge nodes; a caching designation by which the content is stored at one or more edge nodes; and a hybrid designation by which content is stored at a node in the CDN for subsequent transport to one or more edge nodes in the CDN, the computer program code causing the processor to perform the selection by carrying out the following steps: determining a set of one or more transport designation options each identifying a set of nodes and links between nodes for transporting the content from the entrance node to one or more edge nodes for delivery to content consumers; determining a set of one or more caching designation options each identifying a set of edge nodes for storage of the content; determining a set of one or more hybrid designation options each identifying a set of nodes for storage of the content and a set of nodes and links between nodes for transporting the stored content to edge nodes; determining a normalised measure resource requirement for each of the transport, caching and hybrid designation options; and selecting one designation option for the class of content from all of the transport, caching and hybrid designation options by an optimisation function for selecting the designation option based on the determined normalised resource requirement for each option.

BRIEF DESCRIPTION OF THE FIGURES

Embodiments of the present invention will now be described, by way of example only, with reference to the accompanying drawings, in which.

DETAILED DESCRIPTION

Figure 1:
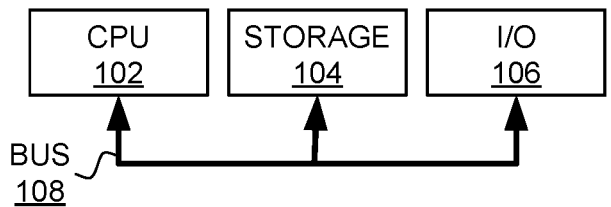
FIG. 1 is a block diagram of a computer system suitable for the operation of embodiments of the present invention.

A first aspect of the present invention provides a method for selecting a designation option of a class of data content, for delivery via a content delivery network (CDN), to content consumers, the CDN including: an entrance node through which the content enters the CDN; one or more intermediate nodes through which the content traverses the CDN; and one or more edge nodes for delivering the content to the content consumers, and the designation of the content determining how the content will be handled by the CDN as one of: a transport designation by which content is transported from the entrance node to one or more edge nodes; a caching designation by which the content is stored at one or more edge nodes; and a hybrid designation by which content is stored at a node in the CDN for subsequent transport to one or more edge nodes in the CDN, the method comprising: determining a set of one or more transport designation options each identifying a set of nodes and links between nodes for transporting the content from the entrance node to one or more edge nodes for delivery to content consumers; determining a set of one or more caching designation options each identifying a set of edge nodes for storage of the content; determining a set of one or more hybrid designation options each identifying a set of nodes for storage of the content and a set of nodes and links between nodes for transporting the stored content to edge nodes; determining a normalised measure resource requirement for each of the transport, caching and hybrid designation options; and selecting one designation option for the class of content from all of the transport, caching and hybrid designation options by an optimisation function for selecting the designation option based on the determined normalised resource requirement for each option.

Preferably the method further comprises determining a performance level for each of the transport, caching and hybrid designation options, wherein the optimisation function is further adapted to select the designation option based on the determined performance level for each option.

Preferably the normalised resource requirements and the performance levels are parameters to the optimisation function and the optimisation function is further adapted to receive weightings to adjust a significance of each of the parameters to the optimisation function.

Preferably the method further comprises: receiving a definition of a required performance for the delivery of the content; comparing a performance level for the selected option with the required performance; responsive to a determination that the selected option does not meet the required performance, disregarding the selected designation option and the optimisation function selection an alternate designation option.

Preferably the method further comprises receiving a definition of a set of consumers served by the CDN for which the class of content is to be available for delivery, and wherein the determination of the sets of transport, caching and hybrid designation options are based on an identification of one or more sets of edge nodes required to deliver content to the set of consumers.

Preferably the definition of a set of consumers for which the class of content is to be available for delivery is determined based on empirical observation of the delivery of content in the class of data content to consumers via the CDN.

Preferably the definition of a set of consumers for which the class of content is to be available for delivery is determined empirically using a machine learning algorithm.

Preferably the method further comprises determining a set of consumers for which content can be delivered by the selected designation option; and responsive to a determination that the selected option does not meet a predetermined threshold proportion of a set of consumers for which the class of content is to be available for delivery, disregarding the selected designation option and the optimisation function selection an alternate designation option.

The present invention accordingly provides, in a second aspect, a computer system including a processor and memory storing computer program code for performing the steps of the method according to the above first aspect, including some, all or none of the optional and preferred features of that aspect.

The present invention accordingly provides, in a third aspect, a computer program element comprising computer program code to, when loaded into a computer system and executed thereon, cause the computer to perform the steps of the method according to the above first aspect, including some, all or none of the optional and preferred features of that aspect.

FIG. 1 is a block diagram of a computer system suitable for the operation of embodiments of the present invention. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
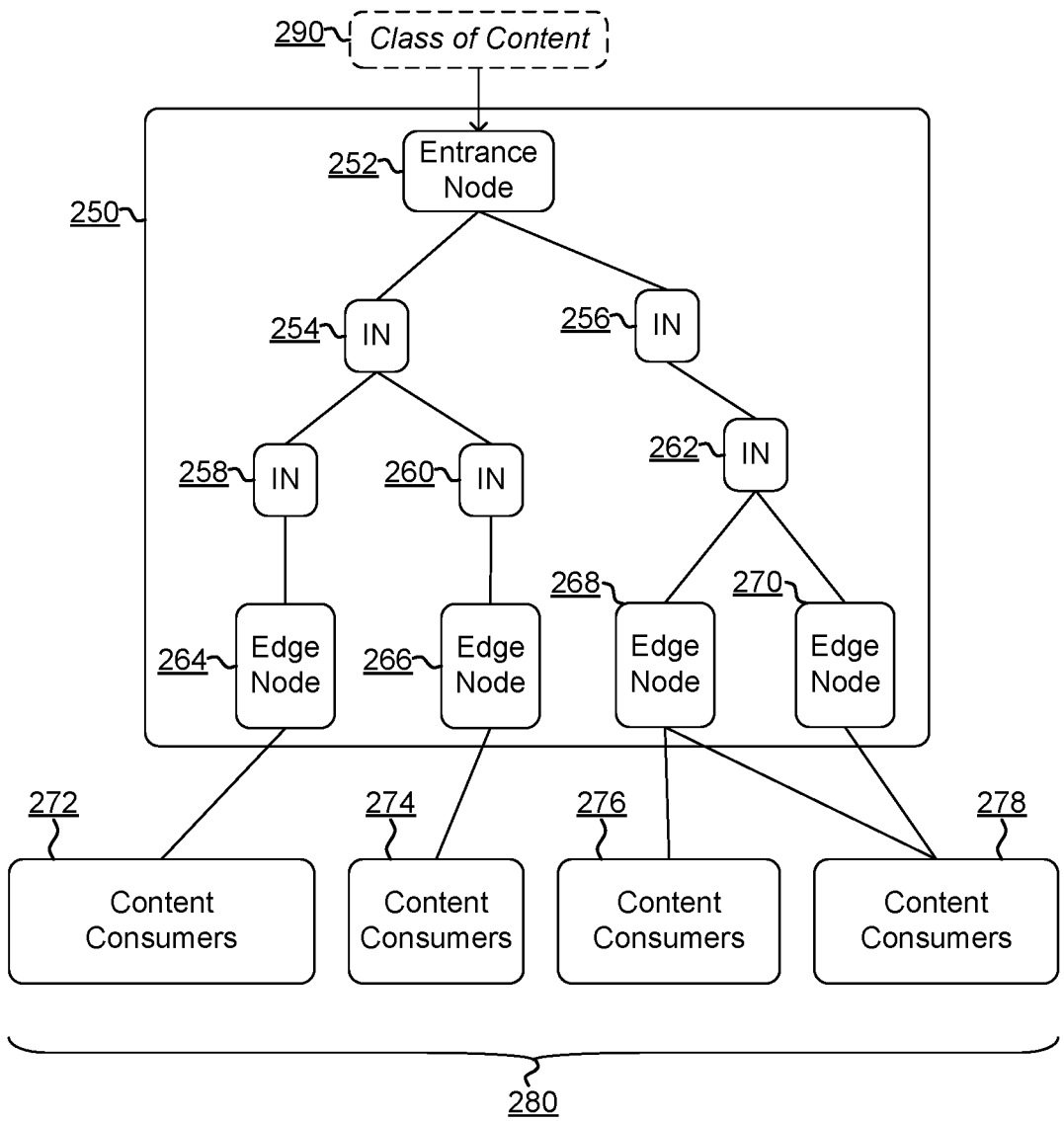
FIG. 2 is a conceptual illustration of an arrangement of a CDN as may be suitable for implementation of embodiments of the invention.

FIG. 2 is a conceptual illustration of an arrangement of a CDN 250 as may be suitable for implementation of embodiments of the invention. The CDN 250 is a logical set of nodes as physical, virtual or combination computer systems, devices and/or appliances such as network appliances forming a network by way of communication means providing interconnections between at least some pairs of the nodes. Such communication means can be a computer network such as a wired or wireless communications medium or other suitable communication means as will be appreciated by those skilled in the art. The CDN 250 is arranged for the receipt, communication and delivery of content to content consumers 280. The content is arranged into classes of content such as content class 290. The class of content 290 is a type, variant, style or domain of content of which particular content data, content items, content streams or the like can be communicated via the CDN 250. For example, the class of content 290 can relate to content associated with a particular content service, a particular content provider, a particular format or structure of content, a particular server and/or client application generating and/or consuming the content, one or more particular sources or origins of the content, and other such associations as will be apparent to those skilled in the art. For example, content may be media content such as audio, video or multimedia content. A class of content may be content associated with a particular service provider such as a media organisation providing delivered or streamed content via the CDN 250. Content may be determined to belong, associate with or derive from the class of content 290 in one or more potentially different ways. Such association may be based on the origin, provider, creator, generator or owner of the content. Such association may be explicitly indicated with, for, by or in association with the content. Such association may be derivable from characteristics of the content such as attributes of the content including content data type, temporal information such as a time of generation, creation or communication of the content, a volume of data in an item of content, a network or system through, from or via which the content is received, a rate of transfer of the content, an encoding of the content, one or more file formats or data structures of the content, applications for the content, and other such suitable associations as will be apparent to those skilled in the art.

Content belonging to the class of content 290 is received by or enters the CDN 250 via a node nominally indicated as an "entrance" node 252. The entrance node 252 can be a specially configured node for receiving content from outside the CDN 250 or otherwise can be similar or identical to other nodes in the CDN 250 and being in communication with an entity outside the CDN 250 through which content is received into the CDN 250. Notably, while a single entrance node 252 is illustrated it will be apparent to those skilled in the art that potentially multiple entrance nodes 252 may be provided. Reference herein to a single entrance node 252 should be read to include the prospect of multiple entrance nodes 252 and modifications to the techniques disclosed herein made accordingly as will be apparent to those skilled in the art on the basis of the teachings herein. The entrance node 252 may receive or access content from one or more sources including: a content provider external to the CDN 250; an interconnected CDN linked communicatively with the CDN 250 such as an interfaced, physically and/or logically neighbouring, connected and/or federated CDN; and/or an intermediate or other entity through which content is delivered to the CDN 250.

The CDN 250 further includes one or more edge nodes 264-270 as nodes in communication with content consumers. Content consumers are systems, appliances, devices or other entities in communication with the CDN 250 via the edge nodes and which receive content from the CDN 250. Notably, a content consumer can include a further CDN connected to the CDN 250 such as in a federated and/or interconnected arrangement of CDNs. Each edge node is adapted to serve content to one or more sets of content consumers by delivering, communicating, making available or otherwise providing content to the content consumers. The edge nodes 264-270 collectively provide for the delivery of content by the CDN 250 to a set of consumers 280. Each edge node 264 can deliver content to a different subset of consumers constituting an entire set of consumers 280 to which content can be served by the CDN 250. Thus, edge node 264 serves content consumers 272. Edge node 266 serves content consumers 274. Edge node 268 serves content consumers 276 and 278. Edge node 278 serves content consumers 278. Notably multiple edge nodes can serve the same set or subset of content consumers, as is the case with edge nodes 268 and 270 which both serve content consumers 278. Where the sets of content consumers served by two edge nodes are entirely different (i.e. the intersect between the sets is an empty set) then the two edge nodes can be described as consumer-disjoint. Notably, edge node 264 is consumer-disjoint with all the other edge nodes 266-270. Similarly, edge nodes 266 is consumer disjoint with all the other edge nodes. However, edge nodes 268 and 270 are not consumer disjoint with respect to each other because they both serve content consumers 278.

While the CDN 250 is configured to provide content to all indicated content consumers 280, a particular class of content such as content class 290 can be directed to only a subset of all the consumers 280. For example, where content of the class 290 is geographically sensitive or specific it may only be appropriate for, requested by or directed to content consumers within a particular geographic region. Similarly, where content consumers are organised according to consumer apparatus, consumer purpose, consumer type, consumer application or any other such organisation then content of class 290 may be directed to or accessible by only a subset of the sets of content consumers 272-278. A subset of content consumers from all consumers 280 to which content of class 290 is to be served is known as a consumer footprint of the content class 290. Thus, by way of example, if content of class 290 is served only, or predominantly, to content consumers 274 and content consumers 278 then the sets of content consumers 274 and 278 constitute the consumer footprint for content class 290.

In some embodiments, the consumer footprint for a content class 290 is predetermined and defined such that one or more particular sets of consumers 272-278 for which content is to be delivered is defined. For example, where content class 290 relates to content for a particular software application then consumers in particular sets of content consumers may be determined to receive or access the content based on their use of the application. In an alternative embodiment, the consumer footprint for a content class 290 is not predetermined and is instead determined based on empirical observation of access to, delivery of or consumption of content by content consumers. Such empirical observation can be made based on monitoring, tracking, tracing, logging or receiving notifications of and/or when content of class 290 is accessed or delivered to particular content consumers. The empirical observation can thus determine a consumer footprint for the content class 290. In one embodiment, data arising from such empirical observation can be used as input to a machine learning algorithm such as a classification algorithm to classify a particular content consumer or set of content consumers as one for which content is to be made available or not.

Once a consumer footprint for a content class 290 is determined and/or defined, it is possible to determine a subset of the set of edge nodes 264-270 required to deliver content to consumers in the consumer footprint. For example, should a consumer footprint for content class 290 include only content consumers 274 and 278 then edge node 266 and one or both of edge nodes 268 and 270 will be required. Thus, there are two possible sets of edge nodes, $E_1$ and $E_2$, to deliver content to consumers 274 and 278:

$E_1$={Node 266, Node 268} and $E_1$={Node 266, Node 270}

The two sets of edge nodes $E_1$ and $E_2$ are used to constitute a set S of edge node sets for the content class 290:

S={$E_1$, $E_2$}

Thus, one or more sets of edge nodes required to serve content of class 290 is readily determined based on a model of the CDN 250 and a definition of the consumer footprint for the class 290. Such a model of the CDN 250 can be predetermined based on an arrangement of nodes and interconnections between the nodes, or alternatively can be discerned and/or learned based on monitoring, probing or inference.

Accordingly, in an arrangement of a CDN 250 such as that illustrated in FIG. 2, it is advantageous to designate a class of content 290 according to how the content is to be handled in the CDN 250 for delivery to a consumer footprint for the class 290. Content class 290 can be designated as: one of potentially numerous transport designations by which content is transported from the entrance node 252 to one or more edge nodes 264-270 via specific intermediate nodes; one of potentially numerous caching designations by which content is stored at a set of specific edge nodes; or one of potentially numerous hybrid designations by which content is stored at one or more specific nodes in the CDN 250 for subsequent transport to one or more edge nodes in the CDN 250. Thus, embodiments of the present invention are configured to determine transport designation options, caching designation options and hybrid designation options and to select therebetween based on an optimisation approach to select a particular designation for content class 290. Transport designation options each identify a set of nodes and links between nodes for transporting content from the entrance node 252 to a set of edge nodes E for delivery to content consumers in the consumer footprint. Caching designation options identify a set of edge nodes E for storage of content for delivery to content consumers in the consumer footprint. Hybrid designation options identify a set of nodes for storage of content and a further set of nodes and links between nodes for transporting the stored content to edge nodes E for delivery to content consumers in the consumer footprint.

Figure 3:
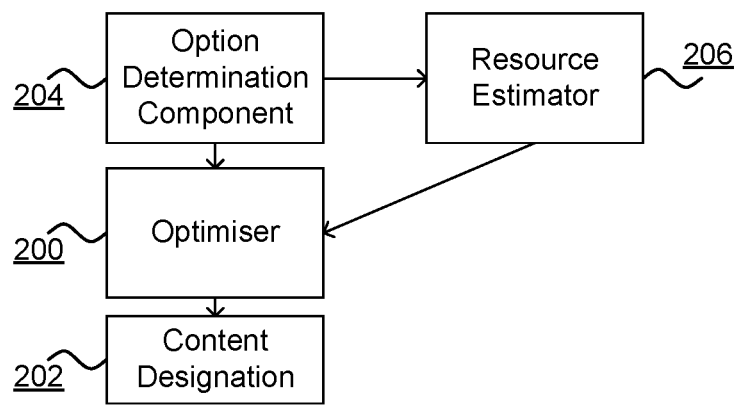
FIG. 3 is a component diagram of a system for designating a class of data content for delivery via a CDN in accordance with embodiments of the present invention.

FIG. 3 is a component diagram of a system for designating a class of data content for delivery via a CDN in accordance with embodiments of the present invention. An option determination component 204 is a hardware, software, firmware or combination component adapted to determine designation options for a content class 290 including each of transport, caching and hybrid designation options. In a preferred embodiment, the options determined by the component 204 include an exhaustive set of options such that: all transport options between the entrance node 252 and all edge nodes in all sets of edge nodes E for delivery to a consumer footprint are determined; all caching options for storage of content at all edge nodes in all sets of edge nodes E are determined; and all hybrid options for storage of content and transport of content to all edge nodes in all sets of edge nodes E are determined. In alternative embodiments, non-exhaustive approaches to designation option determination can be made including random option identification and/or machine learning approaches in which, for example, initial designation options in each category (transport, caching and hybrid) are identified and one or more successive subsequent options are determined based on adjustments to such initial options using, for example, a convergence, contrastive divergence and/or hill-climbing algorithm approach, and/or adjusting parameters for a search algorithm to identify such subsequent options.

In one embodiment, a single transport designation option can include a definition of a directed graph through the CDN 250 for communication of content from the entrance node 252 to a set E of edge nodes for delivery to content consumers in a consumer footprint. Notably, multiple such transport designations may be identified for a content class 290 due to a multiplicity of possible routes through nodes in the CDN 250 and/or a multiplicity of possible sets, E, of edge nodes for delivery to content consumers in the consumer footprint.

In one embodiment, a single caching designation option can include a definition of a set E of edge nodes for storage of content for delivery to content consumers in a consumer footprint. Notably, multiple such caching designations may be identified for a content class 290 due to a multiplicity of possible sets, E, of edge nodes for delivery to content consumers in the consumer footprint.

In one embodiment, a single hybrid designation option can include an identification of a node for storage of content for delivery and further a definition of a directed graph through the CDN 250 for communication of content from the entrance node 252 to a set E of edge nodes for delivery to content consumers in a consumer footprint. Notably, multiple such hybrid designations may be identified for a content class 290 due to a multiplicity of nodes at which storage of content may be desirable, a multiplicity of routes through the CDN 250 from a node identified for content storage and a set E of edge nodes for delivery to a consumer footprint, and/or a multiplicity of possible sets, E, of edge nodes for delivery to content consumers in the consumer footprint. Further, in some embodiments a hybrid option can include an identification of a multiple nodes for storage of content and an identification of multiple directed graphs from each such storage node for communicating content to consumers in the consumer footprint.

The arrangement of FIG. 3 further includes a resource estimator 206 as a hardware, software, firmware or combination component for estimating an amount of resource to be consumed by the CDN 250 in delivering content of class 290 according to a designation option. In a preferred embodiment, a resource consumption measure is normalised across multiple categories of resource such as storage resource, processing resource, network communication resource and the like such that direct comparisons of resource requirement for disparate designation options can be made. In this way, an optimisation algorithm can operate on the basis of designation options of each category (transport, caching and hybrid) at the same time to effectively optimise with respect to estimated resource consumption.

The normalised measure of resource consumption can be defined, calibrated and/or standardised by any suitable means and using any suitable scale. Subsequently, resource consumption of operations in the CDN 250 involving resources for the delivery of content according to each designation each can be evaluated. For example, a data storage operation, such as a caching operation, will consume resource according to: a volume of storage required; a frequency of storage read/write operations required and/or provided; a quality of storage integrity such as an objective measure of integrity, reliability and/or resilience; a type, frequency and nature of storage backup and/or recovery; a nature of storage device(s) employed such as magnetic disk, solid state non-volatile memory, tape or other storage media; a speed of operation of one or more storage devices such as an operating read/write speed or other objective measure of performance; objective measures of thermal or acoustic performance; and other characteristics of storage the nature of which will be apparent to those skilled in the art. Similarly, a network communication operation, such as a transport operation between nodes, will consume resource according to: an amount of bandwidth consumed; a speed of transfer; an error rate; a retry rate; resend operations; any end-point buffering employed and resources consumed to achieve such buffering; an amount of time during which a communication link is occupied by a content transport; and other characteristics of network consumption the nature of which will be apparent to those skilled in the art.

On the basis of such resource consumption measures, each resource in the CDN 250 has associated a definition of resources required to undertake a resource operation for a designation option. Preferably, each resource in the CDN 250 has a definition of a normalised rate of resource consumption for a particular volume of content. For example, a normalised quantity of resource involved in storing a volume of content at a node of CDN 250 according to a caching designation option can be determined. Similarly, a quantity of resource involved in transporting a volume of content between two nodes of CDN 250 according to a transport designation option can be determined. Thus, cumulative and/or aggregate normalised measures of resource consumption can be evaluated for an entire designation option based on the resource consumption definitions for resources in the CDN 250. Notably, rates of resource consumption for different resources in the CDN 250 can vary based on characteristics of the individual resources such as a performance of individual resources. For example, a relatively slow magnetic storage device may consume resource at a lower rate per volume of content than a relatively fast solid-state storage device.

Considering an example in use, a transport designation option for content class 290 may involve communication between entrance node 252 and edge node 264 via intermediate nodes 254 and 258. Such an option will thus consume communication resource for each of communication between: nodes 252 and 254; nodes 254 and 258; and nodes 258 and 264. A resource consumption for such a designation option can be evaluated based on definitions of normalised rates of resource consumption for each communication link between these pairs of nodes. For example: if a resource consumption rate for the link between nodes 252 and 254 is 10 normalised units of resource per gigabyte (GB) of content; a resource consumption rate for the link between nodes 254 and 258 is 30 normalised units of resource per GB of content; and a resource consumption rate for the link between nodes 258 and 264 is 5 normalised units of resource per GB of content, then the total normalised resource consumption across the transport designation option is 10+30+5=45 normalised units of resource per GB of content. Such a measure of resource consumption can therefore be used for comparative and optimising purposes in accordance with embodiments of the present invention.

In order to assess a predicted resource consumption for a designation option, a forecast volume of content can be used with normalised rates of resource consumption for resources used by a designation option. Such forecast volumes can be based on empirical observation, tracing, monitoring, recording and/or profiling of volumes of content communicated and/or stored via CDN 250 in use. It can be beneficial to determine predicted resource consumption volumes in order that a division of content between nodes in the CDN 250 can be understood, such as proportions of content likely to take certain branches of a directed graph representation in a transport or hybrid designation option, or proportions of content likely to be stored at certain nodes for caching content in a caching or hybrid designation option. For example, in a transport designation option defined by a directed graph representation of nodes in the CDN 250 having a branch towards two different edge nodes, a volume of content directed down each branch towards each edge node will be related to a proportion of an overall volume of traffic communicated to content consumers served by each edge node respectively. In this way, a normalised measure of resource consumption for a designation option can be determined based on an understanding of proportions of content distribution and/or storage in the CDN 250 for a content class 290.

Returning to FIG. 3, the resource estimator 206 thus determines an estimate normalised resource consumption measure for each designation option determined by the option determination component 204. Subsequently, an optimiser 200 is a software, hardware, firmware or combination component for identifying a preferred content designation 202 based on the set of options determined by the option determination component and a normalised resource consumption measure for each option determined by the resource estimator 206.

In one embodiment, the optimiser 200 is configured to determine an option presenting a lowest normalised resource consumption measure. Such an option is output as a content designation 202 for the content class 290. In an alternative embodiment, the optimiser 200 is configured to determine a content designation option 202 based on an optimisation function taking parameters including: a normalised resource consumption for each option; and a proportion of a consumer footprint served by each option. In such an embodiment, a proportion of consumer footprint served by each option can be determined by a comparison of a consumer footprint served by an option based on content consumers served by edge nodes included in the option, and a consumer footprint determined to be desired for the content class 290. In one embodiment, where the content class 290 has associated a required content consumer footprint, if the optimiser 200 determines that the required consumer footprint is not served by a selected designation option then the designation option is disregarded and the optimiser 200 selects an alternate designation option. Such reselection can occur repeatedly until a designation option serving the required consumer footprint is identified. Furthermore, each parameter for an optimisation function can be weighted using a weighting factor applied to each parameter in order to bias the optimisation function toward one or more particular parameters.

Figure 4:
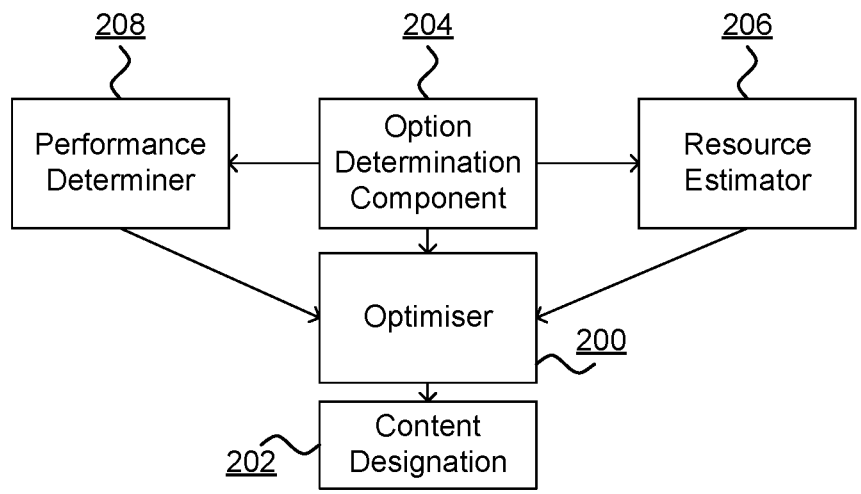
FIG. 4 is a component diagram of a system for designating a class of data content for delivery via a CDN in accordance with embodiments of the present invention.

FIG. 4 is a component diagram of a system for designating a class of data content for delivery via a CDN in accordance with embodiments of the present invention. Many of the features in the arrangement of FIG. 4 are identical to those described above with respect to FIG. 3 and these will not be repeated here. FIG. 4 further includes a performance determiner 208 as a software, hardware, firmware or combination component for determining a performance level of the CDN 250 in use for each designation option determined by the option determination component 204. Performance can be determined by the performance determiner 208 for each of at least a subset of resources in the CDN 250 such as storage and/or network communication resources for and/or between the nodes. For example, performance can include: network delay; network jitter; network loss rate; network error rate; data storage delay; data storage loss rate; data storage error rate; and other performance characteristics as will be apparent to those skilled in the art. Thus, an indication and/or measure of performance for each designation option identified by the option determination component 204 can be evaluated and used as a parameter for input to the optimisation function of the optimiser 200. Thus, in such embodiments, the optimiser 200 can be arranged to identify a selected content designation based on resource consumption of options and performance of options. In one embodiment, each performance characteristic is combined additively with other performance characteristics for parameterisation to the optimisation function. In one embodiment, each performance characteristic is weighted according to predetermined weighting to bias the optimisation function towards certain performance characteristics. Additionally and/or alternatively, in one embodiment each of the resource consumption and performance level measures are weighted when applied to the optimisation function of the optimiser 200.

In one embodiment, the content class 290 has associated one or more performance level definitions. Each performance level definition can relate to a required or desired level of performance of the delivery of content of class 290 such as: a delay associated with retrieving content by a content consumer; a speed of transfer of content delivered to a content consumer; a data rate of content delivered to a content consumer; a volume of content delivered to a content consumer; and other performance characteristics as will be apparent to those skilled in the art. In one embodiment, such performance level definitions for the content class 290 include a definition of one or more bounds and/or ranges of performance. In one embodiment, the optimiser 200 selects a content designation 202 based on an optimisation function and subsequently compares a performance of the selected content designation according to the performance determiner 208 to determine if a performance requirement for the content class 290 is satisfied. In one embodiment, where it is determined that a performance requirement for the content class 290 is not satisfied, the optimiser 200 can disregard the selected designation option and identify an alternate designation option. Such checking of performance level can continue iteratively until a designation option with suitable performance is identified.

Figure 5:
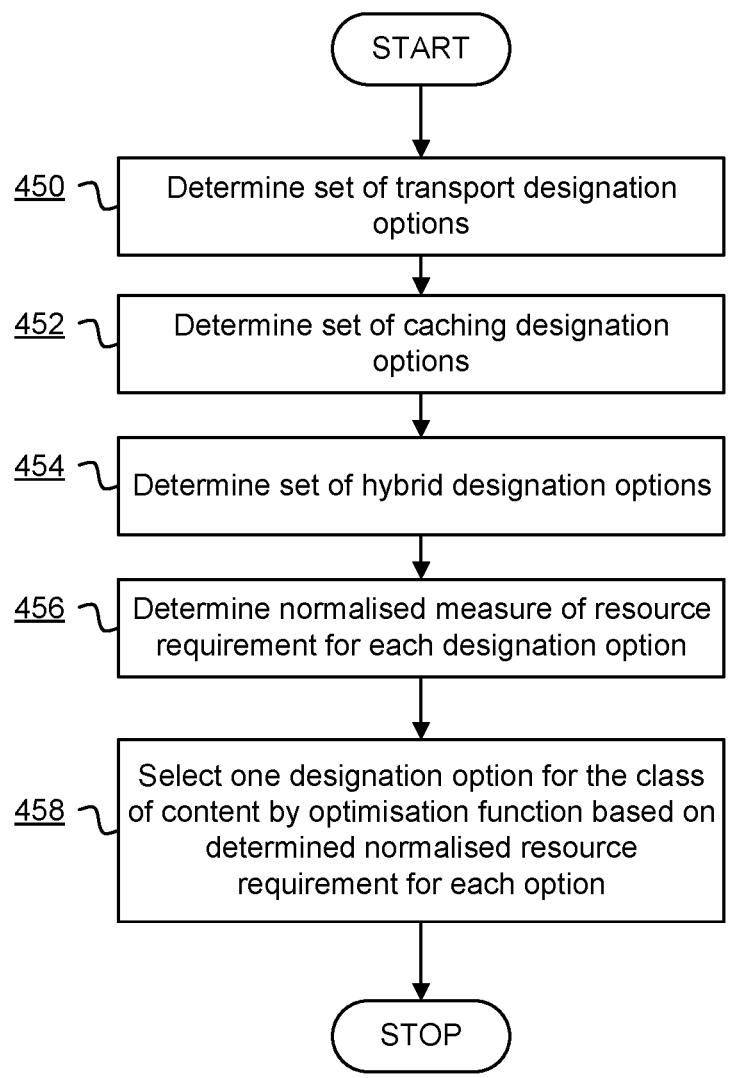
FIG. 5 is a flowchart of a method for designating a class of data content for delivery via a CDN according to an embodiment of the present invention.

FIG. 5 is a flowchart of a method for designating a class 290 of data content for delivery via a CDN 250 according to an embodiment of the present invention. At step 450 the method determines a set of one or more transport designation options. Each transport option identifies a set of nodes and links between nodes for transporting content of the content class 290 from the entrance node 252 to one or more edge nodes for delivery to content consumers in a consumer footprint. At step 452 the method determines a set of one or more caching designation options. Each caching option identifies a set of edge nodes for storage of content of the content class 290 for delivery to content consumers in the consumer footprint. At step 454 the method determines a set of one or more hybrid designation options. Each hybrid designation option identifies a set of nodes for storage of the content and a set of nodes and links between nodes for transporting the stored content to edge nodes for delivery to content consumers in the consumer footprint. At step 456 the method determines a normalised measure resource requirement for each of the transport, caching and hybrid designation options. At step 458 the method selects one designation option for the class of content from all of the transport, caching and hybrid designation options by an optimisation function for selecting the designation option based on the determined normalised resource requirement for each option.

As previously described, the method of FIG. 5 can optionally be supplemented by additionally determining a performance level for each of the transport, caching and hybrid designation options such that the optimisation function is further adapted to select the designation option based on the determined performance level for each option. Further, the method can be optionally supplemented by receiving a definition of a required performance for the delivery of the content and comparing a performance level for the selected option with the required performance. In such an embodiment, where the selected option does not meet the required performance, selected designation option can be disregarded and the optimisation function can selection an alternate designation option. The method can be optionally supplemented by receiving a definition of a set of consumers served by the CDN 250 for which the class of content 290 is to be available for delivery. In such an embodiment, the determination of the sets of transport, caching and hybrid designation options can be based on an identification of one or more sets of edge nodes required to deliver content to the set of consumers.

In one embodiment, algorithms are provided for identifying one or more options for designating content of a class C for delivery via a CDN in each of three designations: transport options; caching options; and/or hybrid options. Each option is described in detail below. While the particular algorithms and techniques described are suitable for identifying such options for the delivery of content of class C, alternative suitable techniques could also be employed as will be apparent to those skilled in the art on the basis of the present description. In particular, the algorithms described here are intended to exemplify the operation of a suitable embodiment for the purpose of demonstration. Efficiency improvements, deduplication, optimisation and other alternative implementations could equally apply including alternatives seeking to identify potential options and not necessarily seeking to identify substantially all or a majority of options. For example, alternative techniques can employ machine learning algorithms using, e.g. contrastive divergence to identify promising changes that can be made to candidate options towards further potentially promising options.

According to the exemplary embodiment, for content class C, a set S of all sets E of edge nodes in a CDN required for the delivery of content to all consumers in a consumer footprint for class C is defined. Each set of edge nodes E includes edge nodes $e_1 \ldots e_i$ for delivering content to a set of consumers $T_{ei}$ such that:

$$T_{e1} \cap T_{e2} \cap \ldots T_{ei} = \emptyset$$

i.e. each set of edge nodes E in set S consists of edge nodes $e_1 \ldots e_i$ that collectively cover all consumers for the consumer footprint for content class C in the CDN, but none of the edge nodes $e_1 \ldots e_i$ cover duplicate consumers. Such a set of edge nodes E can be described as consumer-disjoint.

Methods of the option determination component 204 for identifying designation options for content of class C delivered to consumers by a CDN having edge node sets S will now be described.

Identifying Transport Options.

A transport option for designating a class of content C is an option in which all content is transported as required from an entrance node in a CDN to a set of one or more edge nodes providing the content to consumers according to the consumer footprint. Transport options can be determined for each set of edge nodes $E \in S$ based on the algorithm below.

Exemplary pseudo-code for the identification of transport options is:

--- for each set of edge nodes E∈S
  for each edge node e∈ $\{e_1, \ldots e_i\}$ in E
    identify set $P_e$ of all paths $p_1 \ldots p_n$ from an entrance node to the edge node e, each path p being an ordered set of node tuples $\{N_s, N_d\}$ corresponding to transport from $N_s$ to $N_d$.

-continued next e (so as to generate a set P for each edge node e as $P_{e1} \ldots P_{ei}$)
define R as a set of all path combinations $r_1 \ldots r_a$ such that each combination r is a combination of paths $p_1 \ldots p_n$ from each of $P_{e1} \ldots P_{ei}$
consolidate each path combination r to a set q of unique node tuples in the path combination r where set $Q_E$ is a set of all consolidated path combinations $q_1 \ldots q_a$ for set of edge nodes E
next set of edge nodes E

---

Thus, $Q_E$ contains sets q of node tuples required for the transport of content of class C to all edge nodes in E to deliver content to a required consumer footprint. Each set q in $Q_E$ constitutes a transport option on which basis a resource measure for the transport of content of class C can be evaluated.

Figure 6:
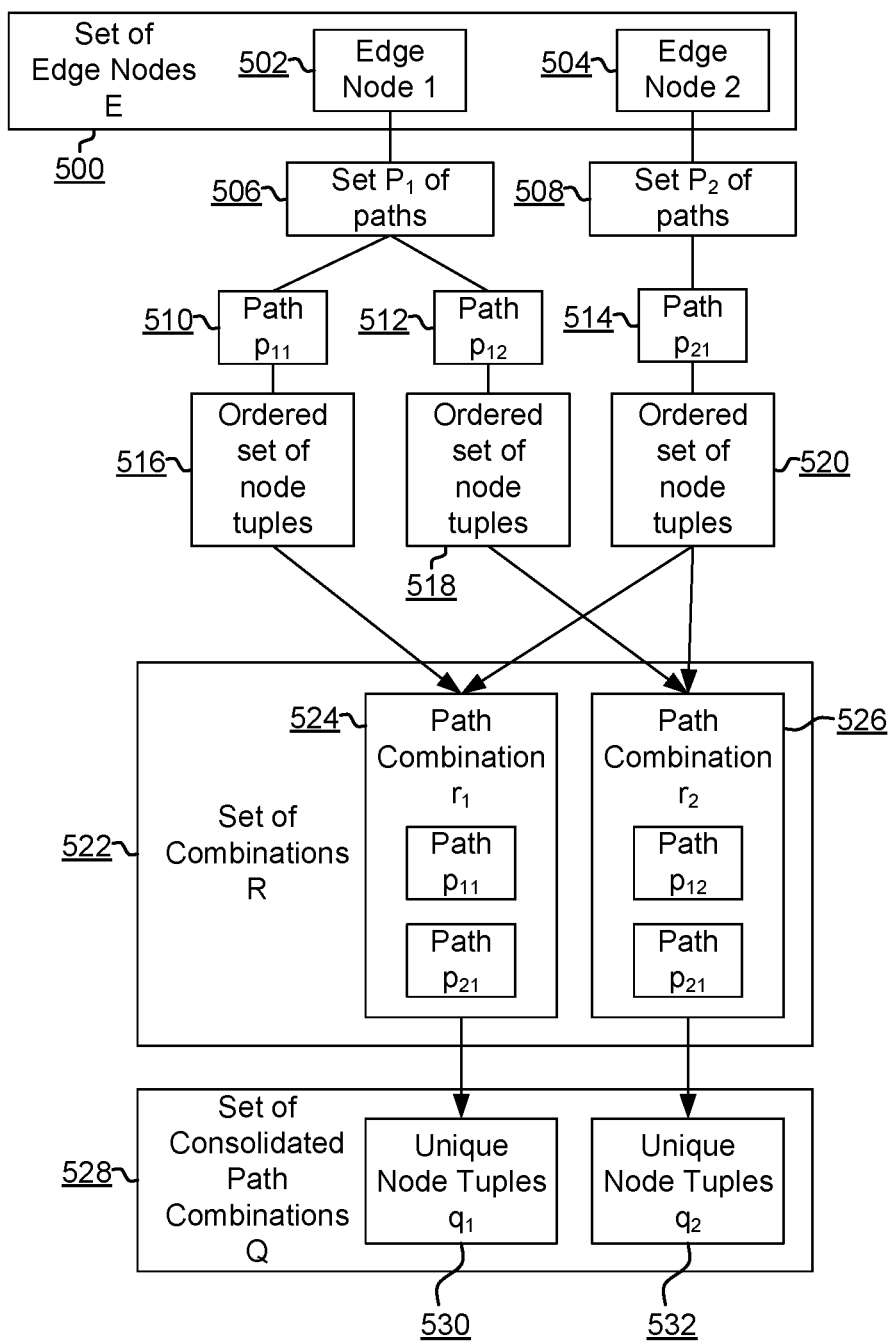
FIG. 6 illustrates the exemplary algorithm in use for identifying transport options for delivery of content of class C via a CDN in an embodiment of the present invention.

FIG. 6 illustrates the exemplary algorithm in use for identifying transport options for delivery of content of class C via a CDN in an embodiment of the present invention. According to the illustrative arrangement which is provided by way of example only to demonstrate the algorithm in use, a set of edge nodes E 500 includes edge node 1 502 and edge node 2 504. In practical application, the set of edge nodes E 500 is a set of edge nodes of the CDN required for delivery of content to a consumer footprint. For edge node 1 502 a set of paths $P_1$ 506 is identified between an entrance node and the edge node 1 502. The set of paths $P_1$ 506 includes paths $p_{11}$ 510 and $p_{12}$ 512. For edge node 2 504 a set of paths $P_2$ 508 is identified between the entrance node and the edge node 2 504. The set of paths $P_2$ 508 includes the single path $p_{21}$ 514. Each path is an ordered set of node tuples 516, 518, 520 such that each node tuple in the path corresponds to a transport of content from a source node to a destination node.

A set of path combinations R 522 is defined as a set of all path combinations $r_1$ 524 and $r_2$ 526 such that each combination r is a combination of each of paths $p_{11}$ and $p_{12}$ from $P_1$ with path $p_{21}$ from $P_2$. Thus, there are two path combinations: $r_1$ 524 consisting of path $p_{11}$ from $P_1$ and $p_{21}$ from $P_2$; and $r_2$ 526 consisting of path $p_{12}$ from $P_1$ and $p_{21}$ from $P_2$. Each of the path combinations $r_1$ and $r_2$ thus includes combinations of paths as ordered sets of node tuples.

Subsequently, the set of combinations R is converted to a set of consolidated path combinations Q 528 by removing duplicate node tuples in each path combination $r_1$ 524 and $r_2$ 526. Thus, where path combination $r_1$ includes ordered set of node tuples 516 for path $p_{11}$ and ordered set of node tuples 520 for path $p_{21}$, any duplicate node tuples in sets 516 and 520 are removed to create a set $q_1$ of unique node tuples 530. Similarly, where path combination $r_2$ includes ordered set of node tuples 518 for path $p_{12}$ and ordered set of node tuples 520 for path $p_{21}$, any duplicate node tuples in sets 518 and 520 are removed to create a set $q_2$ of unique node tuples 532.

In this way, each set of unique node tuples $q_1$ and $q_2$ constitutes a transport option on which basis a resource measure for the transport of content of class C can be evaluated. Each set q of unique node pairs in Q defines a directed graph of the routes through the CDN for content from an entrance node to a set of edge nodes E to satisfy a required consumer footprint. Resource requirement for edges of the graph can be determined for transport purposes. Where the graph splits, the resource requirement can be determined based on empirical information for likely content volumes along outgoing edges of the graph split. Thus, resource requirement can be associated with each edge in the graph to determine an overall measure of resource requirement for each transport option represented by $q \in Q$.

Identifying Caching Options.

A caching option for designating a class of content C is an option in which content is cached by being stored at each of a set of edge nodes for delivery to consumers such that content can be delivered by the edge nodes from the cache to all consumers in a consumer footprint for content class C. Each set of edge nodes E∈S is a caching option such that, in each option, all edge nodes in E cache content of class C. Thus, the edge node sets E in S identify caching options for which a resource measure for storage to cache content of class C for delivery to requisite consumers can be determined.

Identifying Hybrid Options.

A hybrid option for designating a class of content C is an option in which transport takes place in conjunction with caching. In a preferred embodiment, caching for a hybrid option takes place at a node in a CDN other than an entrance or edge node, though caching at the entrance node is possible and cannot be disregarded in some embodiments where, for example, few nodes constitute a CDN or entrance nodes are in direct communication with edge nodes. According to one embodiment, a hybrid option is identified wherever a node exists in at least two paths to edge nodes in a set of paths r. In this way, a caching option can be provided to potentially reduce a resource demand for transport to such a node common to at least two paths by caching content at the node. Transport then takes place between the identified node and edge nodes. Thus, such options provide a hybrid between caching and transport.

Exemplary pseudo-code for the identification of hybrid options is:

```
for each path set r∈R for a set of edge nodes E∈S
    for each node m occurring in multiple of paths p₁...pₖ in r
        generate set r' of paths p'₁...p'ₖ corresponding to each path p₁...pₖ
        in r such that node tuples {Ns, Nd} in a path p containing m are
        removed up to, but excluding, a first tuple for which Ns = m.
        add new {r', m} tuple to set of hybrid options H_E
    next node m
next path set r
```

Thus, in this way, set r' of paths p' is generated where each path p' corresponds to a path $p_i$ that excludes sub-paths leading to common node m in any of paths $p_1 \ldots p_k$. Each {r', m} tuple in H includes r' as a set of paths $p'_1 \ldots p'_k$ for which more than one of the paths is associated with a node m such that content is cached at m and transported across paths $p'_1 \ldots p'_k$ to edge nodes to provide delivery to all consumers in the consumer footprint. Notably, on the basis of the teachings herein, it will be apparent that the algorithm for identification of hybrid options can be repeated multiple times to identify potentially multiple nested or combination hybrid options such that multiple nodes can be identified for caching content in a single hybrid designation option.

The hybrid options of H can be used to determine a resource measure for each option including a measure of resource for transport for the delivery of content of class C to requisite consumers and a measure of resource for storage for caching of content of class C in accordance with each option. The paths for evaluating transport resource requirement are provided in the r' element of each hybrid option tuple, and a node for caching is provided in each m element of each hybrid option tuple.

Figure 7:
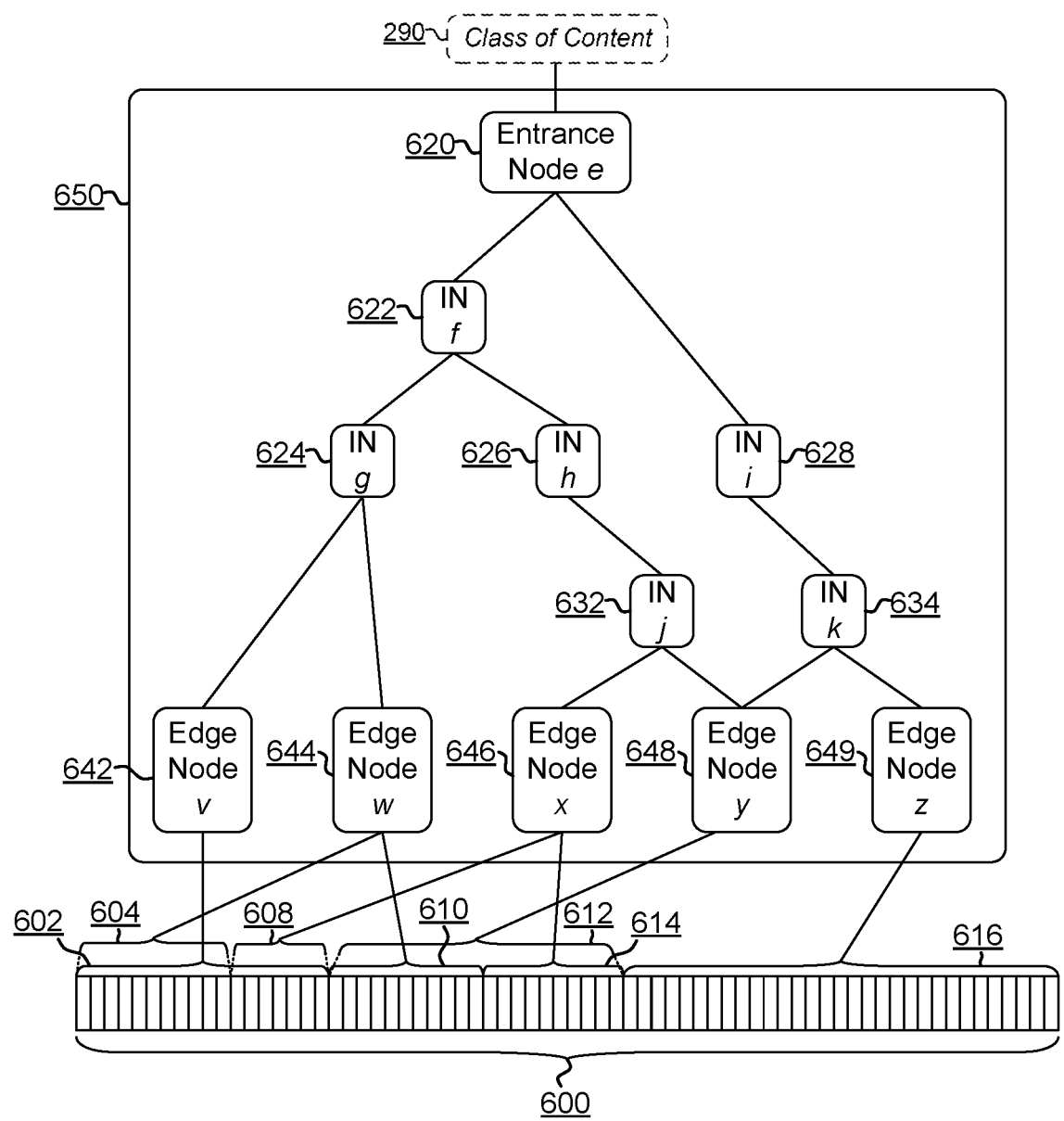
FIG. 7 illustrates an exemplary CDN in use for the delivery of content of class C to a content consumer footprint in accordance with embodiments of the present invention.

FIG. 7 illustrates an exemplary CDN 650 in use for the delivery of content of class C to a content consumer footprint 600 in accordance with embodiments of the present invention. The arrangement of FIG. 7 will be used to illustrate the operation of the option determination component 204 of FIG. 3 or 4 in use to determine designation options for content class C.

The arrangement of CDN 650 includes an entrance node e 620 communicatively connected to each of intermediate nodes f 522 and l 628. Node f 622 is communicatively connected to intermediate nodes g 624 and h 626. Intermediate node g 624 is communicatively connected to edge node v 642 and edge node w 644. Intermediate node h 626 is communicatively connected to intermediate node j 632 which is, itself, communicatively connected to edge node x 646 and edge node y 648. Intermediate node l 628 is communicatively connected to intermediate node k 634 which is itself connected to edge node y 648 and edge node z 649.

A content consumer footprint 600 for content class C is split into content consumer sets 602-616. Edge node v 642 serves content consumer set 602. Edge node w 644 serves content consumer set 604 as a subset of set 602. Edge node w 644 also serves content consumer set 610. Edge node x 646 serves content consumer set 608 as a subset of set 602 that is disjoint with respect to set 604. Edge node x 646 also serves content consumer set 614. Edge node y 648 serves content consumer set 612 which is an aggregation of sets 610 and 614. Edge node z 649 serves content consumer set 616.

The consumer footprint of content class C is thus served by two sets of edge nodes such that $S=\{E_1, E_2\}$ where $E_1=\{v, y, z\}$ and $E_2=\{w, x, z\}$.

In respect of $E_1$, the intersect of consumer sets T served by each edge node is:

$$T_v \cap T_y \cap T_z = \emptyset$$

In respect of $E_2$, the intersect of consumer sets T served by each edge node is:

$$T_w \cap T_x \cap T_z = \emptyset$$

The operation of the option determination component 204 for determining transport, caching and hybrid designation options will now be considered according to the algorithms described previously and with respect to the exemplary CDN of FIG. 7.

Determining Transport Options

Considering the relevant transport routes for $E_1=\{v, y, z\}$:

For edge node v 642 in set $E_1$, set $P_v$ of all paths is defined as:

$P_v=\{p_{v1}\}$ where $p_{v1}=\{\{e, f\}, \{f, g\}, \{g, v\}\}$

For edge node y 648 in set $E_1$, set P, of all paths is defined as:

$P_y=\{p_{y1}, p_{y2}\}$ where $p_{y1}=\{\{e, f\}, \{f, h\}, \{h, j\}, \{j, y\}\}$ and $p_{y2}=\{\{e, i\}, \{i, k\}, \{k, y\}\}$ For edge node z 649 in set $E_1$, set $P_z$ of all paths is defined as:

$P_z=\{p_{z1}\}$ where $p_{z1}=\{\{e, i\}, \{i, k\}, \{k, z\}\}$ such that the set of all combinations of all paths $R_{vyz}$ across $P_v$, $P_y$ and $P_z$ is:

$R_{vyz}=\{r_1, r_2\}$ where $r_1=\{p_{v1}, p_{y1}, p_{z1}\}$ and $r_2=\{p_{v1}, p_{y2}, p_{z1}\}$ Elaborated, $r_1$ is:

$$r_1 = \{$$
$$\{\{e, f\}, \{f, g\}, \{g, v\}\quad\quad\},$$
$$\{e, f\}, \{f, h\}, \{h, j\}, \{j, y\}\quad\},$$
$$\{e, i\}, \{i, k\}, \{k, z\}\quad\quad\quad\}$$
$$\}$$

Consolidating $r_1$ to set $q_1$ of all unique node pairs in all paths or $r_1$ gives:

$$q_1 = \{\ \{e, f\}, \{f, g\}, \{g, v\},$$
$$\{f, h\}, \{h, j\}, \{j, y\},$$
$$\{e, i\}, \{i, k\}, \{k, z\}\ \}$$

Elaborated, $r_2$ is:

$$r_2 = \{$$
$$\{\{e, f\}, \{f, g\}, \{g, v\}\ \},$$
$$\{e, i\}, \{i, k\}, \{k, y\}\ \},$$
$$\{e, i\}, \{i, k\}, \{k, z\}\ \}$$
$$\}$$

Consolidating $r_2$ to set $q_2$ of all unique node pairs in all paths or $r_2$ gives:

$$q_2 = \{\ \{e, f\}, \{f, g\}, \{g, v\},$$
$$\{e, i\}, \{i, k\}, \{k, y\},$$
$$\{k, z\}\quad\quad\quad\quad\}$$

Figure 8:
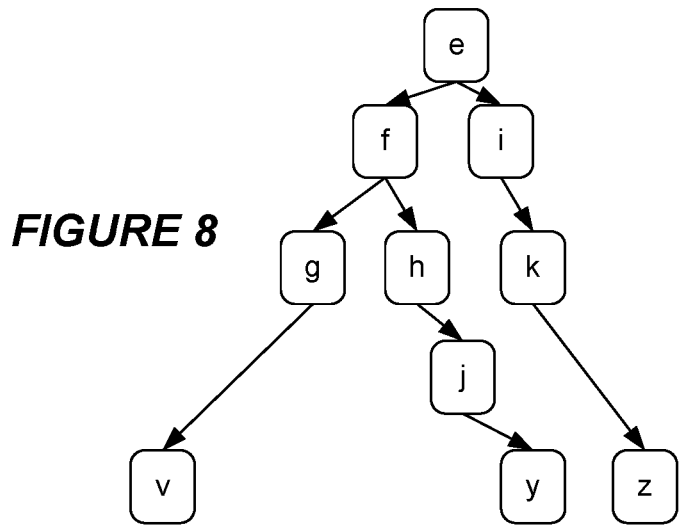
FIG. 8 illustrates the directed graph according to $q_1$ of $Q_{vyz}$ in accordance with an embodiment of the present invention.
Figure 9:
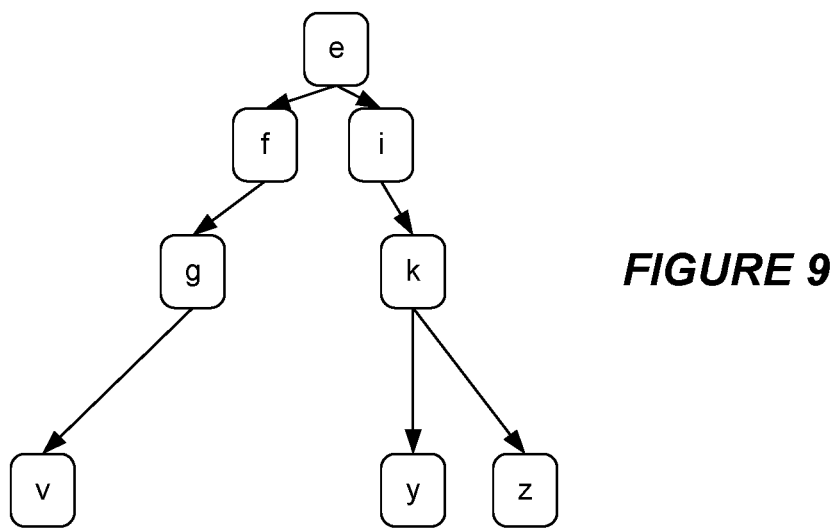
FIG. 9 illustrates the directed graph according to $q_2$ of $Q_{vyz}$ in accordance with an embodiment of the present invention.

Thus, set $Q_{vyz}$ defining directed graphs of routes through the CDN 650 for content from the entrance node e 620 to the set of edge nodes $E_1$ for a set of consumers 600 corresponding to content class C is:

$Q_{vyz} = \{q_1, q_2\}$ $Q_{vyz}$ can be used to determine a resource measure for transport options for the delivery of content of class C to requisite consumers 600. FIG. 8 illustrates the directed graph according to $q_1$ of $Q_{vyz}$. FIG. 9 illustrates the directed graph according to $q_2$ of $Q_{vyz}$.

Considering the relevant transport routes for $E_2=\{w, x, z\}$:

For edge node w 644 in set $E_2$, set $P_w$ of all paths is defined as:

$P_w = \{p_{w1}\}$
where
$p_{w1}\{\{e, f\}, \{f, g\}, \{g, w\}\}$

For edge node x 646 in set $E_2$, set $P_x$ of all paths is defined as:

$P_x = \{p_{x1}\}$
where
$p_{x1} = \{\{e, f\}, \{f, h\}, \{h, j\}, \{j, x\}\}$

For edge node z 649 in set $E_2$, set $P_z$ of all paths is as defined above.

Such that the set of all combinations of all paths $R_{wxz}$ across $P_w$, $P_x$ and $P_z$ is:

$R_{wxz} = \{r_3\}$
where
$r_3 = \{p_{w1}, p_{x1}, p_{z1}\}$
Elaborated, $r_3$ is:

$$r_3 = \{$$
$$\{\{e, f\}, \{f, g\}, \{g, w\}\quad\quad\},$$
$$\{e, f\}, \{f, h\}, \{h, j\}, \{j, x\}\quad\},$$
$$\{e, i\}, \{i, k\}, \{k, z\}\quad\quad\quad\}$$
$$\}$$

Consolidating $r_3$ to set $q_3$ of all unique node pairs in all paths or $r_3$ gives:

$$q_3 = \{\ \{e, f\}, \{f, g\}, \{g, w\},$$
$$\{f, h\}, \{h, j\}, \{j, x\},$$
$$\{e, i\}, \{i, k\}, \{k, z\}\ \}$$

Figure 10:
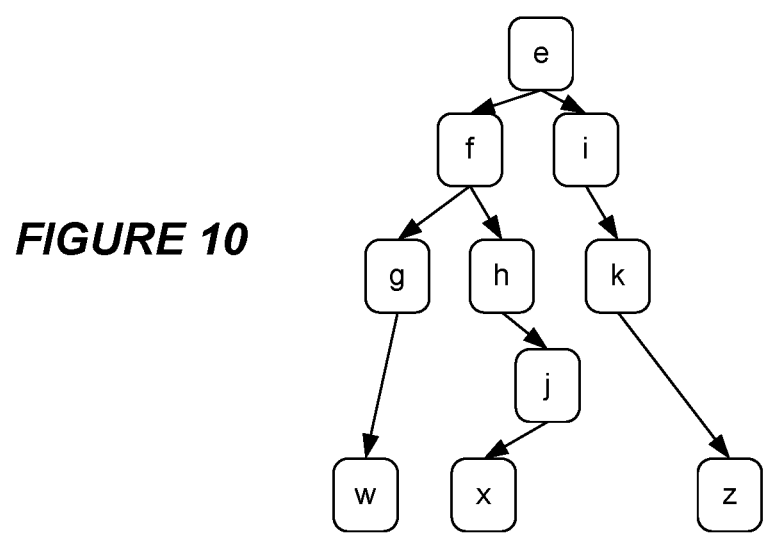
FIG. 10 illustrates the directed graph according to q3 of Qwxz in accordance with an embodiment of the present invention.

Thus, set $Q_{wxz}$ defining directed graphs of routes through the CDN 650 for content from the entrance node e 620 to the set of edge nodes $E_2$ for a set of consumers 600 corresponding to content class C is:

$Q_{wxz} = \{q_3\}$ $Q_{wxz}$ can be used to determine a resource measure for a transport option for the delivery of content of class C to requisite consumers 600. FIG. 10 illustrates the directed graph according to $q_3$ of $Q_{wxz}$.

Determining Caching Options

Each set of edge nodes $E_1$ and $E_2$ in S is a caching option such that: caching according to option $E_1$ can be achieved by providing a cache of content of class C at each of the edge nodes v, y, z; and caching according to option $E_2$ can be achieved by providing a cache of content of class C at each of the edge nodes w, x, z. Thus, the edge node sets E in S identify caching options for which a resource measure for storage to cache content of class C for delivery to requisite consumers 600 can be determined.

Determining Hybrid Caching/Transport Options

Considering possible hybrid options for edge node set $E_1 = \{v, y, z\}$:

The set of nodes occurring in at least two of the paths of $r_1$ (excluding the entrance node and edge nodes) is:

$M_{r_1} = \{f\}$

For each path $p_{v1}$, $p_{y1}$ and $p_{z1}$ in $r_1$, removing any node tuples $\{N_s, N_d\}$ in the path up to, but excluding, a first tuple for which $N_s = m \in M_{r_1}$ where m=f to form $r'_1$ consisting of reduced paths $p'_{v1}$, $p'_{y1}$ and original path $p_{z1}$ accordingly:

$$r'_1 = \{$$
$$\{\{f, g\}, \{g, v\}\quad\quad\},$$
$$\{f, h\}, \{h, j\}, \{j, y\}\quad\},$$
$$\{e, i\}, \{i, k\}, \{k, z\}\quad\}$$
$$\}$$

Thus, according to this hybrid option, caching takes place at node f 622 according to $M_{r1}$ and transport takes place from node f 622 to edge nodes v 642 and y 648 respectively along reduced paths $p'_{v1}$ and $p'_{y1}$, with path $p_{z1}$ remaining intact as a complete path from the entrance node e 620.

The hybrid option is added to a hybrid set $H_{E1}$ as a $\{r', m\}$ tuple, thus:

$H_{E1} = \{\{r'_1, f\}\}$

The set of nodes occurring in at least two of the paths of $r_2$ (excluding the entrance node and edge nodes) is:

$M_{r2} = \{i, k\}$

For each path $p_{v1}$, $p_{v2}$ and $p_{z1}$ in $r_2$, removing any node tuples $\{N_s, N_d\}$ in the path up to, but excluding, a first tuple for which $N_s = m \in M_{r2}$ where m=i to form $r'_2$ consisting of original path $p_{v1}$ and reduced paths $p'_{v2}$, $p'_{z1}$ accordingly:

$$r'_2 = \{$$
$$\{e, f\}, \{f, g\}, \{g, v\}\quad\},$$
$$\{i, k\}, \{k, y\}\quad\},$$
$$\{i, k\}, \{k, z\}\quad\}$$
$$\}$$

Thus, according to this hybrid option, caching takes place at node i 628 according to $M_{r2}$ and transport takes place from node i 628 to edge nodes y 648 and z 649 respectively along reduced paths $p'_{y2}$ and $p'_{z1}$, with path $p_{v1}$ remaining intact as a complete path from the entrance node e 620.

The hybrid option is added to a hybrid set $H_{E1}$ as a $\{r', m\}$ tuple, thus:

$$H_{E1} = \{\ \{r'_1, f\ \},$$
$$\{r'_2, i\ \}\ \}$$

Further, for each path $p_{v1}$, $p_{y2}$ and $p_{z1}$ in $r_2$, removing any node tuples $\{N_s, N_d\}$ in the path up to, but excluding, a first tuple for which $N_s = m \in M_{r2}$ where m=k to form $r''_2$ consisting of original path $p_{v1}$ and reduced paths $p''_{y2}$, $p''_{z1}$ accordingly:

$$r''_2 = \{$$
$$\{e, f\}, \{f, g\}, \{g, v\}\quad\},$$
$$\{k, y\}\quad\},$$
$$\{k, z\}\quad\}$$
$$\}$$

Thus, according to this hybrid option, caching takes place at node k 634 according to $M_{r2}$ and transport takes place from node k 634 to edge nodes y 648 and z 649 respectively along reduced paths $p''_{y2}$ and $p''_{z1}$, with path $p_{v1}$ remaining intact as a complete path from the entrance node e 620.

The hybrid option is added to a hybrid set $H_{E1}$ as a $\{r'', m\}$ tuple, thus:

$$H_{E1} = \{\ \{r'_1, f\ \},$$
$$\{r'_2, i\ \},$$
$$\{r''_2, k\ \}\ \}$$

Considering possible hybrid options for edge node set $E_2 = \{w, x, z\}$:

The set of nodes occurring in at least two of the paths of $r_3$ (excluding the entrance node and edge nodes) is:

$M_{r3} = \{f\}$

For each path $p_{w1}$, $p_{x1}$ and $p_{z1}$ in $r_3$, removing any node tuples $\{N_s, N_d\}$ in the path up to, but excluding, a first tuple for which $N_s = m \in M_{r3}$ where m=f to form $r'_3$ consisting of reduced paths $p'_{w1}$, $p'_{x1}$ and original path $p_{z1}$ accordingly:

$$r'_3 = \{$$
$$\{\ \{f, g\}, \{g, w\}\quad\},$$
$$\{f, h\}, \{h, j\}, \{j, x\}\quad\},$$
$$\{e, i\},\ \{i, k\}, \{k, z\}\quad\}$$
$$\}$$

Thus, according to this hybrid option, caching takes place at node f 622 according to $M_{r3}$ and transport takes place from node f 622 to edge nodes w 644 and x 646 respectively along reduced paths $p'_{w1}$ and $p'_{x1}$, with path $p_{z1}$ remaining intact as a complete path from the entrance node e 620.

The hybrid option is added to a hybrid set $H_{E2}$ as a $\{r', m\}$ tuple, thus:

$H_{E2}\{\{r'_3, f\}\}$

The hybrid options of $H_{E1}$ and $H_{E2}$ can be used to determine a resource measure for each option including a measure of resource for transport for the delivery of content of class C to requisite consumers 600 and a measure of resource for storage for caching of content of class C in accordance with each option. Each option in $H_{E1}$ and $H_{E2}$ is provided as a $\{r', m\}$ tuple. The paths for evaluating transport resource requirement are provided in the r' element of each hybrid option tuple, and a node for caching is provided in each m element of each hybrid option tuple.

Thus, embodiments of the present invention identify designation options for content for delivery via a CDN including: transport options for transporting content to consumers via the CDN; caching options for storing content within the CDN for delivery to consumers without additional inter/intra-CDN transport; and hybrid options including storage of content within the CDN for transport within the CDN to edge nodes of the CDN for delivery to consumers.

Resource requirements for each option can therefore be determined as described above. Further, in some embodiments, performance levels can be determined for each option. Such options, resource requirements and (optionally) performance levels can be used as parameters to an optimisation function to determine a selected designation option for a content class.

It will be appreciated by those skilled in the art that, while embodiments of the present invention are described for the delivery of content via a CDN to consumers, such consumers can themselves include CDNs such as linked, interconnected, federated or otherwise communicatively connected CDNs. Thus, in such arrangements, a consumer or set of consumers as previously described can be served via such a further CDN and an edge node for delivering content to such consumer(s) can be a node for interfacing a first CDN with a second CDN such as part of a federated CDN arrangement.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The content of all documents referred to herein is hereby incorporated by reference.

The invention claimed is:

1. A method for selecting a designation option of a class of data content, for delivery via a content delivery network (CDN) to content consumers, the CDN including: an entrance node through which the content enters the CDN; one or more intermediate nodes through which the content traverses the CDN; and one or more edge nodes for delivering the content to the content consumers, and the designation of the content determining how the content will be handled by the CDN as one of: a transport designation by which content is transported from the entrance node to one or more edge nodes; a caching designation by which the content is stored at one or more edge nodes; and a hybrid designation by which content is stored at a node in the CDN for subsequent transport to one or more edge nodes in the CDN, the method comprising:

determining a set of one or more transport designation options each identifying a set of nodes and links between nodes for transporting the content from the entrance node to one or more edge nodes for delivery to content consumers;

determining a set of one or more caching designation options each identifying a set of edge nodes for storage of the content;

determining a set of one or more hybrid designation options each identifying a set of nodes for storage of the content and a set of nodes and links between nodes for transporting the stored content to edge nodes;

determining a normalised measure resource requirement by normalizing each of: a storage resource, a processing resource, and a network communication resource, for each of the transport, caching and hybrid designation options; and selecting one designation option for the class of content from all of the transport, caching and hybrid designation options by an optimisation function for selecting the designation option based on the determined normalised resource requirement for each option, wherein said optimisation function includes either:

determining all transport options between the entrance node and all edge nodes, determining all caching options for storage of the content at all edge nodes, and determining all hybrid options for storage of content and transport of content to all edge nodes; or determining an initial designation option for each of the transport, caching and hybrid designation option, and determining one or more successive subsequent options based on adjustment to the initial designation options using any one of, a convergence approach, a contrastive divergence approach, a hill-climbing algorithm approach, and a search algorithm approach.

2. The method of claim 1 further comprising:
determining a performance level for each of the transport, caching and hybrid designation options, wherein the optimisation function is further adapted to select the designation option based on the determined performance level for each option.

3. The method of claim 2 where the normalised resource requirements and the performance levels are parameters to the optimisation function and the optimisation function is further adapted to receive weightings to adjust a significance of each of the parameters to the optimisation function.

4. The method of claim 2 further comprising:
receiving a definition of a required performance for the delivery of the content;
comparing a performance level for the selected option with the required performance;
responsive to a determination that the selected option does not meet the required performance, disregarding the selected designation option and the optimisation function selection an alternate designation option.

5. The method of claim 1 further comprising:
receiving a definition of a set of consumers served by the CDN for which the class of content is to be available for delivery, and wherein the determination of the sets of transport, caching and hybrid designation options are based on an identification of one or more sets of edge nodes required to deliver content to the set of consumers.

6. The method of claim 5 wherein the definition of a set of consumers for which the class of content is to be available for delivery is determined based on data obtained by monitoring, tracking, tracing, logging or receiving notifications of the delivery of content in the class of data content to consumers via the CDN.

7. The method of claim 6 wherein the definition of a set of consumers for which the class of content is to be available for delivery is determined using the data as an input to a machine learning algorithm.

8. The method of claim 6 further comprising:
determining a set of consumers for which content can be delivered by the selected designation option; and
responsive to a determination that the selected option does not meet a predetermined threshold proportion of a set of consumers for which the class of content is to be available for delivery, disregarding the selected designation option and the optimisation function selection an alternate designation option.

9. A computer system including a processor and memory storing computer program code which, when executed, causes the processor to select a designation option of a class of data content, for delivery via a content delivery network (CDN) to content consumers, the CDN including: an entrance node through which the content enters the CDN; one or more intermediate nodes through which the content traverses the CDN; and one or more edge nodes for delivering the content to the content consumers, and the designation of the content determining how the content will be handled by the CDN as one of: a transport designation by which content is transported from the entrance node to one or more edge nodes; a caching designation by which the content is stored at one or more edge nodes; and a hybrid designation by which content is stored at a node in the CDN for subsequent transport to one or more edge nodes in the CDN, the selection being performed by the processor carrying out the following steps:

determining a set of one or more transport designation options each identifying a set of nodes and links between nodes for transporting the content from the entrance node to one or more edge nodes for delivery to content consumers;

determining a set of one or more caching designation options each identifying a set of edge nodes for storage of the content;

determining a set of one or more hybrid designation options each identifying a set of nodes for storage of the content and a set of nodes and links between nodes for transporting the stored content to edge nodes;

determining a normalised measure resource requirement by normalizing each of: a storage resource, a processing resource, and a network communication resource, for each of the transport, caching and hybrid designation options; and selecting one designation option for the class of content from all of the transport, caching and hybrid designation options by an optimisation function for selecting the designation option based on the determined normalised resource requirement for each option, wherein said optimisation function includes either:

determining all transport options between the entrance node and all edge nodes, determining all caching options for storage of the content at all edge nodes, and determining all hybrid options for storage of content and transport of content to all edge nodes; or determining an initial designation option for each of the transport, caching and hybrid designation option, and determining one or more successive subsequent options based on adjustment to the initial designation options using any one of: a convergence approach, a contrastive divergence approach, a hill-climbing algorithm approach, and a search algorithm approach.

10. The computer system of claim 9 wherein the computer program code, when executed, further causes the processor to:

determine a performance level for each of the transport, caching and hybrid designation options, wherein the optimisation function is further adapted to select the designation option based on the determined performance level for each option.

11. The computer system of claim 10 where the normalised resource requirements and the performance levels are parameters to the optimisation function and the optimisation function is further adapted to receive weightings to adjust a significance of each of the parameters to the optimisation function.

12. The computer system of claim 10 wherein the computer program code, when executed, further causes the processor to:

receive a definition of a required performance for the delivery of the content;

compare a performance level for the selected option with the required performance;

responsive to a determination that the selected option does not meet the required performance, disregard the selected designation option and the optimisation function selection an alternate designation option.

13. The computer system of claim 9 wherein the computer program code, when executed, further causes the processor to:

receive a definition of a set of consumers served by the CDN for which the class of content is to be available for delivery, and wherein the determination of the sets of transport, caching and hybrid designation options are based on an identification of one or more sets of edge nodes required to deliver content to the set of consumers.

14. The computer system of claim 13 wherein the definition of a set of consumers for which the class of content is to be available for delivery is determined based on data obtained by monitoring, tracking, tracing, logging or receiving notifications of the delivery of content in the class of data content to consumers via the CDN.

15. The computer system of claim 14 wherein the definition of a set of consumers for which the class of content is to be available for delivery is determined using the data as an input to a machine learning algorithm.

16. The computer system of claim 14 wherein the computer program code, when executed, further causes the processor to:

determine a set of consumers for which content can be delivered by the selected designation option; and responsive to a determination that the selected option does not meet a predetermined threshold proportion of a set of consumers for which the class of content is to be available for delivery, disregard the selected designation option and the optimisation function selection an alternate designation option.

17. A computer program element comprising computer program code to, when loaded into a computer system having a processor and executed thereon, causes the processor to select a designation option of a class of data content, for delivery via a content delivery network (CDN) to content consumers, the CDN including: an entrance node through which the content enters the CDN; one or more intermediate nodes through which the content traverses the CDN; and one or more edge nodes for delivering the content to the content consumers, and the designation of the content determining how the content will be handled by the CDN as one of: a transport designation by which content is transported from the entrance node to one or more edge nodes; a caching designation by which the content is stored at one or more edge nodes; and a hybrid designation by which content is stored at a node in the CDN for subsequent transport to one or more edge nodes in the CDN, the computer program code causing the processor to perform the selection by carrying out the following steps:

determining a set of one or more transport designation options each identifying a set of nodes and links between nodes for transporting the content from the entrance node to one or more edge nodes for delivery to content consumers;

determining a set of one or more caching designation options each identifying a set of edge nodes for storage of the content;

determining a set of one or more hybrid designation options each identifying a set of nodes for storage of the content and a set of nodes and links between nodes for transporting the stored content to edge nodes;

determining a normalised measure resource requirement by normalizing each of: a storage resource, a processing resource and a network communication resource, for each of the transport, caching and hybrid designation options; and selecting one designation option for the class of content from all of the transport, caching and hybrid designation options by an optimisation function for selecting the designation option based on the determined normalised resource requirement for each option, wherein said optimisation function includes either:

determining all transport options between the entrance node and all edge nodes, determining all caching options for storage of the content at all edge nodes, and determining all hybrid options for storage of content and transport of content to all edge nodes; or determining an initial designation option for each of the transport, caching and hybrid designation option, and determining one or more successive subsequent options based on adjustment to the initial designation options using any one of: a convergence approach, a contrastive divergence approach, a hill-climbing algorithm approach, and a search algorithm approach.

18. The computer program element of claim 17 wherein the computer program code, when executed, further causes the processor to:

determine a performance level for each of the transport, caching and hybrid designation options, wherein the optimisation function is further adapted to select the designation option based on the determined performance level for each option.

19. The computer program element of claim 18 where the normalised resource requirements and the performance levels are parameters to the optimisation function and the optimisation function is further adapted to receive weightings to adjust a significance of each of the parameters to the optimisation function.

20. The computer program element of claim 18 wherein the computer program code, when executed, further causes the processor to:

receive a definition of a required performance for the delivery of the content;

compare a performance level for the selected option with the required performance;

responsive to a determination that the selected option does not meet the required performance, disregard the selected designation option and the optimisation function selection an alternate designation option.

21. The computer program element of claim 17 wherein the computer program code, when executed, further causes the processor to:

receive a definition of a set of consumers served by the CDN for which the class of content is to be available for delivery, and wherein the determination of the sets of transport, caching and hybrid designation options are based on an identification of one or more sets of edge nodes required to deliver content to the set of consumers.

22. The computer program element of claim 21 wherein the definition of a set of consumers for which the class of content is to be available for delivery is determined based on data obtained by monitoring, tracking, tracing, logging or receiving notifications of the delivery of content in the class of data content to consumers via the CDN.

23. The computer program element of claim 22 wherein the definition of a set of consumers for which the class of content is to be available for delivery is determined using the data as an input to a machine learning algorithm.

24. The computer program element of claim 23 wherein the computer program code, when executed, further causes the processor to:

determine a set of consumers for which content can be delivered by the selected designation option; and responsive to a determination that the selected option does not meet a predetermined threshold proportion of a set of consumers for which the class of content is to be available for delivery, disregard the selected designation option and the optimisation function selection an alternate designation option.

* * * * *

UNITED STATES PATENT AND TRADEMARK OFFICE
CERTIFICATE OF CORRECTION

PATENT NO. : 10,594,824 B2
APPLICATION NO. : 15/933995
DATED : March 17, 2020
INVENTOR(S) : Carla Di Cairano-Gilfedder et al.

Page 1 of 1

It is certified that error appears in the above-identified patent and that said Letters Patent is hereby corrected as shown below:

On the Title Page

Item [73], delete "Khalifa University of Science, Technology and Research" and replace with
--- Khalifa University of Science and Technology ---.

Signed and Sealed this
Fourth Day of August, 2020

Andrei Iancu
*Director of the United States Patent and Trademark Office*